United States Patent
Schackmuth

(10) Patent No.: US 6,177,654 B1
(45) Date of Patent: Jan. 23, 2001

(54) CONTACT TOASTER AND METHOD

(75) Inventor: Glenn Schackmuth, Oak Brook, IL (US)

(73) Assignee: Restaurant Technology, Inc., Oak Brook, IL (US)

(*) Notice: Under 35 U.S.C. 154(b), the term of this patent shall be extended for 0 days.

(21) Appl. No.: 09/266,242

(22) Filed: Mar. 10, 1999

(51) Int. Cl.[7] ............................ A47J 37/08; F27B 9/36
(52) U.S. Cl. ............................ 219/388; 99/386; 99/349
(58) Field of Search .......................... 219/388; 99/331, 99/349, 386, 443 C

(56) References Cited

U.S. PATENT DOCUMENTS

| | | |
|---|---|---|
| 1,828,542 | 10/1931 | Padelford . |
| 2,172,194 | 9/1939 | Ehrgott . |
| 3,400,651 * | 9/1968 | Hatch .................................. 219/388 |
| 3,611,913 | 10/1971 | McGinley ............................ 99/349 |
| 4,261,257 | 4/1981 | Henderson et al. ................. 99/386 |
| 4,404,898 | 9/1983 | Chaudoir . |
| 4,488,480 * | 12/1984 | Miller et al. ........................ 99/386 |
| 4,530,276 | 7/1985 | Miller . |
| 4,822,981 | 4/1989 | Chaudoir . |
| 5,186,097 | 2/1993 | Vaseloff et al. . |
| 5,673,610 | 10/1997 | Stuck .................................... 99/386 |
| 5,821,503 * | 10/1998 | Witt .................................... 219/388 |
| 5,960,704 * | 10/1999 | March et al. ........................ 99/349 |

FOREIGN PATENT DOCUMENTS 579200   7/1946   (GB) .

OTHER PUBLICATIONS

Equipment Manual for Vertical Contact Toaster Model VCT–100, Series 9200XX, Oct. 1997.
Equipment Manual for Vertical Contact Toaster Model VCT–22, Series 92002XX, Aug. 1997.

* cited by examiner

Primary Examiner—Joseph Pelham
(74) Attorney, Agent, or Firm—Ryndak & Lyerla

(57) ABSTRACT

A device for toasting food items is provided. The device includes a toasting chamber for toasting food items by contact with a heated platen along which the food items are transported while in contact with the heated platen surface. The platen includes heating structure which heats the toasting surface by application of energy to the platen such that an energy gradient that decreases in the direction of transport of the food items is achieved.

33 Claims, 3 Drawing Sheets

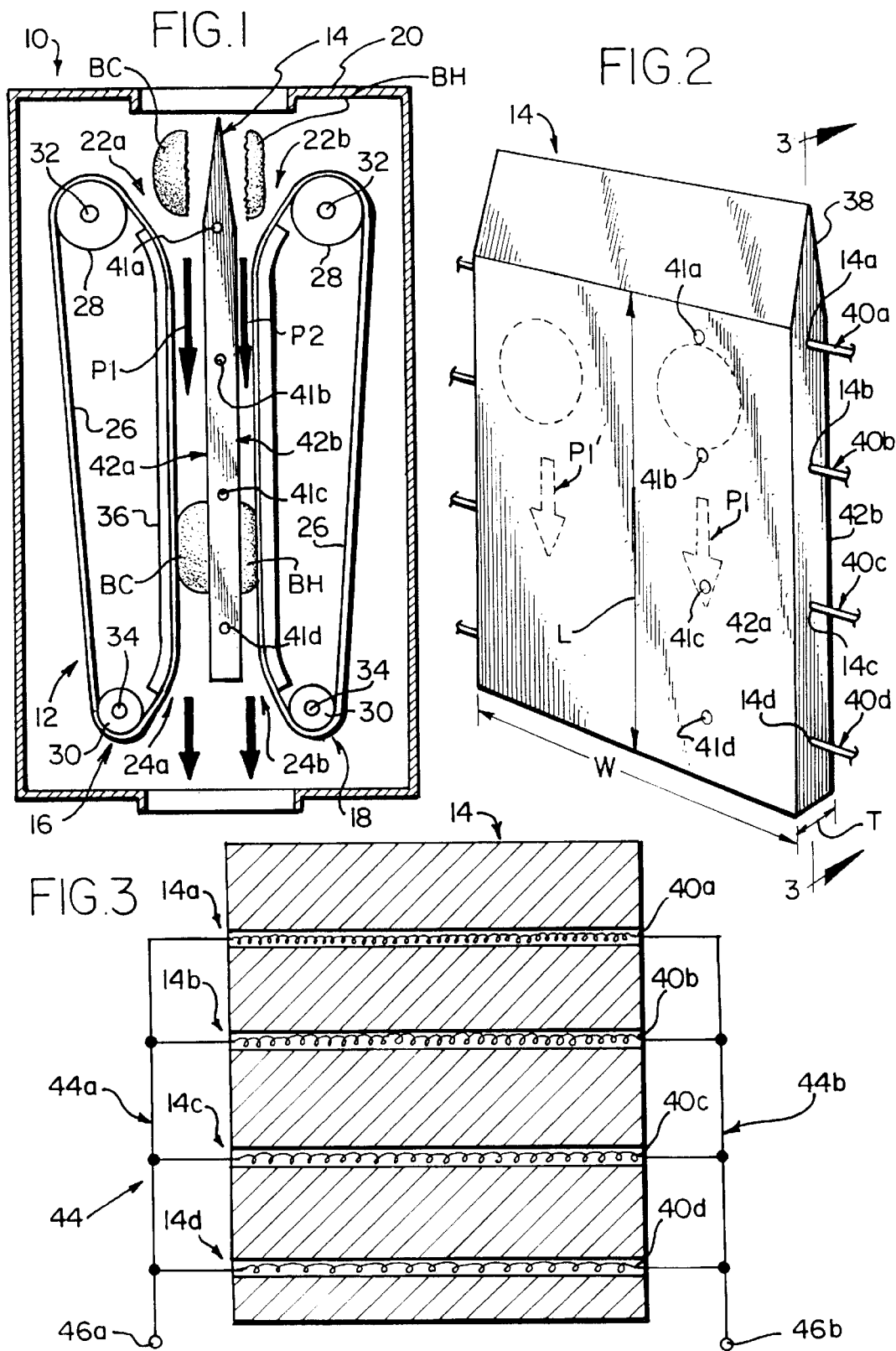

CONTACT TOASTER AND METHOD

FIELD OF THE INVENTION

The present invention relates to a device and method for toasting food products, including products such as hamburger buns. More particularly, the invention relates to a contact toasting device and method that provides uniform and rapid toasting of food products that utilizes an improved heated platen.

BACKGROUND OF THE INVENTION

Various types of contact toasters are known. For example, U.S. Pat. No. 4,530,276 discloses a contact toaster having a housing with an inlet and an outlet in a toasting chamber defined therebetween. A platen capable of being heated is removably positioned within the toasting chamber in between a pair of conveyors intended to convey a product to be toasted along the heated platen. The platen is heated with cal rods or electrical resistance wires.

It is desirable to serve certain types of sandwiches, such as hamburger sandwiches, with toasted buns. Quick-service restaurants that serve such sandwiches often require a large number of toasted buns in a relatively short period of time in order to promptly satisfy customer demand. Consequently, rapid toasting of a large number of buns is desired for such restaurants. For example, a toast time of twenty seconds, fifteen seconds, eleven seconds, or even less, is desirable. To provide faster toasting, increased platen temperatures, for example, in excess of 500° F., and faster conveyor speeds can be utilized. However, rapid toasting must result in uniform toasting of the food product, even when the toasting device is operated continuously or substantially continuously, such as to achieve a high throughput of toasted products, without the occurrence of overtoasting or burning of any portion of the food item.

Consequently, a need exists for a conveyor contact toaster that is capable of rapidly toasting food items, including items such as hamburger buns, when operated under severe service conditions, such as when continuously or substantially continuously toasting food products, without burning or overtoasting of the food items.

SUMMARY OF THE INVENTION

In attempting to provide a conveyor toaster having a rapid toast capability, it was discovered that when the toaster was operated so that the throughput of food items was continuous or substantially continuous with overall heat input sufficient to maintain a desired temperature set point at a location along the toasting pathway, the buns became overtoasted; yet when the device was left running but operated with an intermittent throughput, such problem did not result.

It was discovered that the overtoasting was unexpectedly caused by a condition achieved during continuous or substantially continuous operation in which less heat was being transferred to the buns towards the end of the buns' travel along the toasting run or pathway of the platen and, coupled with the increased bun temperature along that portion of the toasting run, resulted in increasing and excessive temperatures at that portion of the platen.

In accordance with one aspect of the present invention, a device for toasting food products is provided. The device in accordance with the invention includes a toasting chamber having an inlet for receiving food items and an outlet for discharging the food items after toasting. The toasting chamber may be contained in a housing and includes a platen having a toasting surface defining a toasting pathway along which the food items are toasted and a conveyor for transporting the food items along the length of the toasting pathway. The platen includes heating structure for heating the toasting surface by application of energy to the platen. The heating structure is configured to provide a decreasing energy gradient in the direction of transport of the food items along the toasting pathway.

The energy gradient may be present along a portion of or along the entire length of the toasting pathway of the heated surface or platen. Generally, the presence of the energy gradient is most important towards the end of the toasting pathway such as about the last one-half or last one-quarter, for example, of the toasting pathway. This is because at high food product throughput, the platen temperature will increase most towards the end of the platen absent a decreasing energy gradient.

The energy gradient may be linear or nonlinear relative to the length of the toasting pathway. Generally, the energy gradient relative to the entire toasting pathway length will be at least 0.25 watts per square inch of platen surface area and, depending on the gradient desired, may be about 1, 2, or 3 or more watts per square inch of platen surface area relative to the entire toasting pathway.

In accordance with another aspect of the present invention, an energy gradient is provided such that when the device is operated to continuously or to substantially continuously toast the food items, the platen temperature varies less than 30° F. and more preferably less than 10° F. along the toasting pathway. To obtain a decreasing energy gradient, for example, more heat energy is applied to the platen per unit area along the initial portion of the toasting surface length compared to downstream portions of the toasting surface length. This may be accomplished in a number of different ways. For example, the heating element, such as an electrical resistance heating element can be configured to provide the decreasing energy gradient. That can be accomplished, for example, by controlling the resistance per unit length of the heating element so that less heat energy is applied at desired locations within the platen. For example, for a coiled heating element, more coils per inch increase the heat energy produced per length of the electrical resistance heating element and fewer coils per inch results in a decrease of heat energy produced per length traversed by the heating element.

Alternatively, to achieve an energy gradient decreasing in the direction of food item travel along the toasting pathway, a plurality of electrical resistance heating elements can be associated with the platen, with each element having the desired energy output to achieve the desired energy gradient.

The relative spacing of the heating elements (each of which may have the same heat energy output) can also be varied to provide a decreasing energy gradient, such as increasing the distance between heating elements in the direction of food item travel, provided that unacceptably high temperatures along the platen surface do not result.

In accordance with another aspect of the present invention, the platen temperature is monitored during use and the temperature of the platen surface is adjusted, usually by providing a decreasing energy gradient as described, to achieve a platen surface temperature in the desired temperature range. Any suitable temperature measuring device or devices can be utilized, such as one or more thermocouples. The temperature sensing device can be connected to a suitable temperature controller apparatus to regulate the amount of energy applied to a location or various locations along the length of the platen toasting surface.

In accordance with another aspect of the present invention, a method of toasting food products is provided. In one embodiment, the method includes providing a platen energy gradient decreasing in the direction of food item travel along the toasting pathway.

The decreasing energy gradient in accordance with the invention allows a contact toaster to toast food items rapidly and while operated in a manner in which food items are toasted continuously or substantially continuously, without causing the platen to overheat along the downstream or terminal part of the toasting pathway of the platen. For example, utilizing a platen temperature of about 540° F. to 560° F., hamburger buns can be toasted in about eleven seconds and the toasting device can be operated so that food items are continuously fed through and toasted by the device without excessive toasting or burning of the food products when the device is operated in such a manner.

The decreasing energy gradient chosen for a specific application should be such as to provide uniform and not excessive toasting when the device is operated with a continuous or substantially continuous throughput of food items yet provide the desired toasting during intermittent or sporadic throughput. Generally, the energy gradient will be sufficient to prevent excessive temperatures or heat build-up during continuous toasting while maintaining sufficient temperature to provide the desired toasting within the desired time. The energy gradient can be fixed for a particular platen or can be varied with a suitable control system that can regulate the input of heat energy along the toasting pathway of the platen.

Preferably, for toasting hamburger buns the energy gradient will be such that during operation in which toasting is being preformed continuously or substantially continuously, the temperature difference along the toasting pathway surface of the heated platen will be no more than 30° F. and more preferably no more than 10° F., or ±30° F. and preferably ±10° F. from a measured temperature or set point temperature which may be measured at a location along the toasting pathway of the platen.

BRIEF DESCRIPTION OF THE DRAWINGS

The present invention can be more easily understood by reference to the following drawings, in which:

FIG. 1 is a schematic view of a contact toaster chamber in accordance with the present invention;

FIG. 2 is a perspective view of the platen incorporated in the contact toaster of FIG. 1;

FIG. 3 is a sectional view of the platen of FIG. 2 along lines 3—3 of FIG. 2;

DETAILED DESCRIPTION OF THE INVENTION

Figure 4:
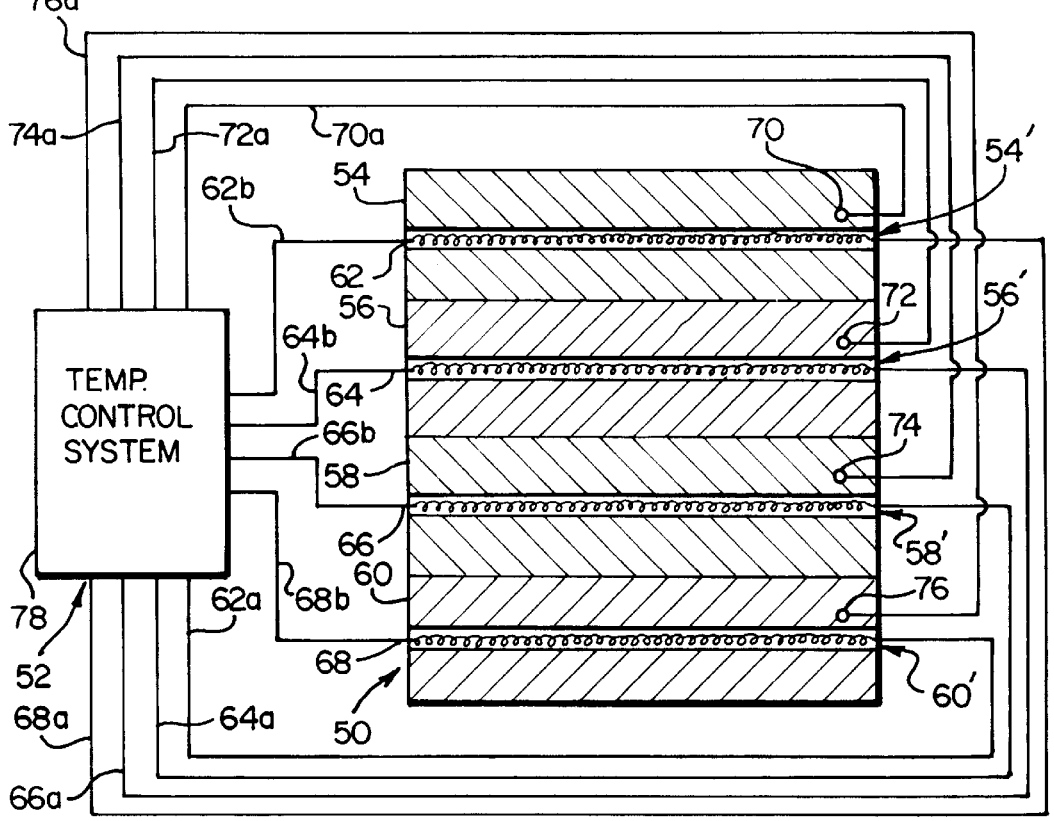
FIG. 4 is a cross sectional view of an alternative embodiment of a contact toaster platen and control system in accordance with the present invention.

Referring to the figures generally, and in particular to FIG. 1, there is illustrated a contact toaster 10 which includes toaster chamber 12 in accordance with the present invention. Toaster chamber 12 includes a heated platen 14 and a pair of driven food transport conveyor assemblies 16, 18, vertically oriented at said sides of platen 14, for transporting buns along platen 14. Toaster chamber 12 may be contained in a suitable cabinet or housing 20.

Contact toaster 10 is illustrated in an embodiment intended for the automated toasting of hamburger sandwich buns on a continuous basis such as in a commercial restaurant setting. Thus, the device is intended for continuous throughput or substantially continuous throughput of the food items. However, those persons skilled in the art will readily recognize that the disclosed contact toaster is susceptible of various other embodiments for toasting other types of food products, whether bread or some other type of food product.

Housing 20 can support toasting chamber 12 therein. Conveyor system elements 16 and 18 are in spaced relation from platen 14 and define a bun insertion opening 22a for bun crown BC and a bun insertion opening 22b for bun heel BH. Two double row bun transport paths P1 and P2 are similarly defined by the relation of conveyor system elements 16 and 18 and platen 14. The width of bun transport path P1 is slightly larger to accommodate the greater thickness of bun crown BC compared to the thickness of bun heel BH. A bun discharge opening 24a and 24b is also provided for bun crown BC and bun heel BH, respectively, towards the bottom of toaster chamber 12.

As illustrated in FIG. 1, each conveyor assembly 16, 18 may include a suitable conveyor belt 26 which can be composed of an endless wire link assembly covered with a flexible material that allows heat distribution. Suitable types of materials include silicone sheets, steel screen material, or any other flexible material that allows heat distribution therethrough. In addition, use of such material prevents the wire link conveyor from leaving burn marks on portions of the bun that would otherwise contact such wire link portion.

Conveyor belt 26 is trained around a pair of upper and lower sprockets 28 and 30 separated by an upper shaft 32 and a lower shaft 34.

Each conveyor belt 26 traverses a tensioner assembly 36 to maintain the tension of conveyor belts 26. Tensioner assemblies 36 may be appropriately biased to maintain a desired tension on conveyor belts 26 and to provide a compressive force on bun crown BC and bun heel BH when those items are transported through bun transport toasting paths P1 and P2 during toasting. The design and construction of contact toaster 10 as described to this point is well known to those skilled in the art, such as in U.S. Pat. Nos. 5,673,610 and 4,530,276, for example.

Figure 6:
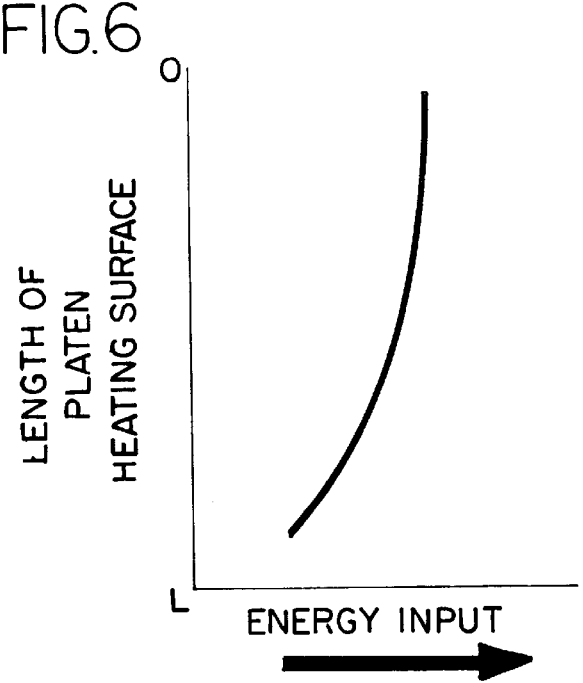
FIGS. 6–8 illustrate examples of various platen energy gradients that can be achieved in accordance with the present invention.
Figure 7:
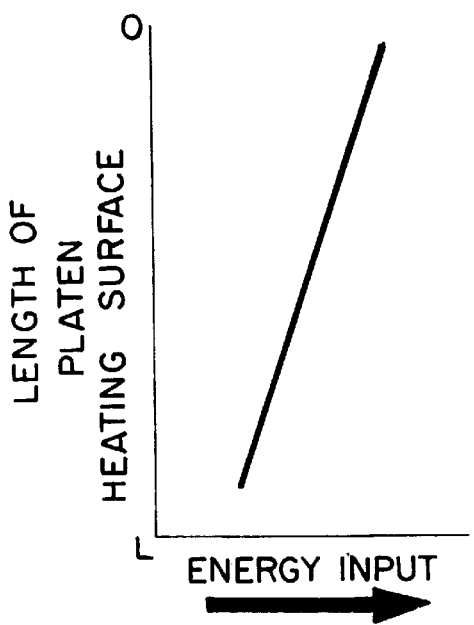

Referring to FIG. 2, there is illustrated in greater detail platen 14. Platen 14 can be constructed of any suitable material, including materials having relatively high heat conductivity such as various metals. Platen 14 includes an upper wedge-shaped end 38 to facilitate insertion of a partially cut bun to be placed therein with the heel portion on one side and the crown portion on the other. Platen 14 includes a plurality of electrical resistance heating elements 40a–d, each of which is longitudinally spaced along the toasting pathway and extends across the width of platen 14, as shown in FIGS. 2 and 3 and contained in apertures 14a–d extending through platen 14. Electrical resistance heating elements 40a–d are preferably contained in the middle of the thickness T of platen 14 so that each toasting surface 42a and 42b of platen 14 are similarly heated. Preferably, the resistance and consequently the energy applied to platen 14 by elements 40a–d is less for element 40d than elements 40a–c. In a preferred embodiment, the energy output of electrical resistance heating elements 40a–d is as follows: 40a—725 watts, 40b—725 watts, 40c—650 watts, and 40d—650 watts. Alternatively, for example, the energy Output of each of elements 40a–c can be substantially equal and the energy output of element 40d less, such as about 5% to about 25% less than the energy output of element 40a, for example, producing an energy gradient as shown in FIG. 6 where in each of FIGS. 6–8 "O" is in reference to the beginning of toasting pathway P1 (adjacent wedge-shaped end 38) and L is at the end of pathway P1 (the bottom of platen 14). To achieve an energy gradient as shown in FIG. 7, the relative energy output of elements 40a–d is as follows: 40a>40b>40c>40d. Adjacent pathway P1' has a similar energy gradient.

As illustrated in FIG. 3, heating elements 40a–d are electrically connected together to form an electrical circuit 44 composed of heating elements 40a–d, electrical connections 44a and b which interconnect electrical resistance heating elements 40a–d to power source terminals 46a and 46b for providing suitable electrical energy to the circuit. An on-off switch and other control circuitry may also be provided (not shown) as desired. For example, the control circuitry may include a proportional controller for controlling the temperature of the platen within a desired range.

One or more thermocouples 41a–d may be provided to sense the temperature of platen 14 along the toasting pathway P1 to assist in controlling the temperature of platen 14 during operation and to maintain the desired energy gradient in other embodiments.

Electrical circuit 44 is typically operated so that about the rated output of heating elements 40a–d is achieved. Operation of circuit 44 results in an energy input gradient across the bun transport paths P1 and P2, which have a length L, as shown in FIG. 2, of about 10.5 inches and a width W of about 12.5 inches. Typically, the energy gradient on the basis of watts per square inch of platen surface relative to the entire toasting surface length will be at least 0.25 watts per square inch over the entire length of the toasting pathway. For example, the energy input density decreases at least 0.25 watts per square inch along the toasting pathway, whether that decrease is gradual and occurs uniformly along the entire length, a portion thereof, or along a step decrease or some other variation. Other energy gradients can be utilized in accordance with the invention, such as decreasing energy gradients of about 1, 2, 3 or more watts per square inch of platen surface area relative to the entire toasting surface length.

As configured in FIG. 3, platen 14 provides a substantially fixed energy gradient since each of heating elements 40a–d are connected in parallel to power source terminals 46a and 46b.

Figure 8:

Referring to FIG. 4 there is illustrated another platen 50 and control system 52 in accordance with the invention. Platen 50 is composed of four discrete platen sections 54, 56, 58 and 60, which are stacked vertically to provide the desired shape and dimensions for platen 50 which is similar to platen 14 shown in FIG. 2. Each platen section 54, 56, 58 and 60 has contained therein an aperture 54', 56', 58' and 60' and extending horizontally across the platen width a heating element 62, 64, 66 and 68, respectively. A thermocouple 70, 72, 74 and 76 is provided for each section 54, 56, 58 and 60, respectively, to monitor the surface temperature of each platen section during operation. Each heating element 62, 64, 66 and 68 has a pair of electrical leads 62a,b, 64a,b, 66a,b and 68a,b, and each thermocouple has a pair of leads 70a, 72a, 74a and 76a, respectively, all of which are connected to temperature control system 78 which consists of suitable monitoring and control circuitry to monitor and maintain the surface temperature of platen sections 54, 56, 58 and 60 at a desired set point or operating temperature range. Control system 78 may include a microprocessor controller including suitable software to regulate an electrical power supply that powers heating elements 62, 64, 66 and 68. Temperature controls can be programmed to provide a desired decreasing platen energy input gradient to platen sections 54, 56, 58 and 60 in the direction of food item transport along the heating surface of platen 50. Examples of gradients that can be achieved are illustrated in FIGS. 6–8. In order to achieve a platen energy input or gradient as shown in FIG. 8 it may be necessary to isolate (such as by a small gap or providing insulation between sections 54 and 56, 56 and 58 and 58 and 60, for example) the sections from each other. By controlling the amount of electrical power supplied to each of elements 62, 64, 66 and 68, the desired energy output and thus the desired surface operating temperature of platen 50 can be achieved. Temperature control system 78 can independently vary the amount of electrical energy supplied to each of elements 62, 64, 66 and 68, thereby providing a variable energy input that is independent of the other heating elements.

If desired, a greater or smaller number of heating elements can be utilized in any of the foregoing embodiments, as will be apparent to one skilled in the art.

Figure 5:
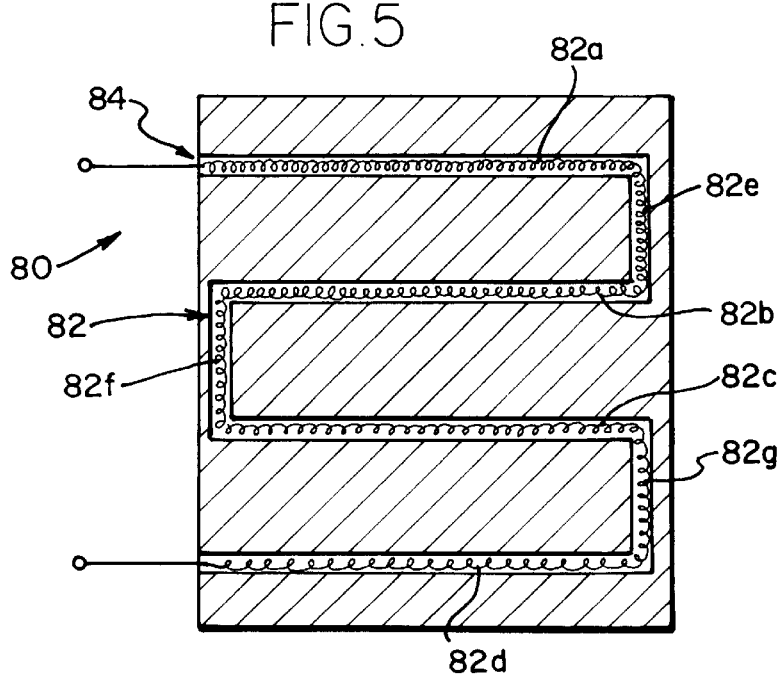
FIG. 5 is a cross sectional view of an alternative embodiment platen in accordance with the present invention.

Referring to FIG. 5, there is illustrated another contact toaster surface platen 80 in accordance with the present invention. Platen 80 is of similar exterior dimensions as platen 14 previously described. Platen 80 differs in that a single heating element 82 is utilized which extends through a serpentine channel 84 located within platen 80.

Heating element 82 includes four different coil densities (coils per inch, for example) in sections 82a–d of element 82 to provide the desired heat energy input gradient during operation in a contact toaster. For example, the heat output and coils per inch of section 82a>82b>82c>82d. Alternatively, for example 82a=82b=82c>82d or 82a=82b>82c>82d to provide a desired energy gradient along the toasting pathway of platen 80. A thermocouple or thermocouples may also be included for a temperature control system (not shown). The vertical sections 82e, f, g of element 82 may have coil per inch densities as desired and may not have any coils to minimize energy input along such vertical sections, as desired.

EXAMPLE

A platen for a bun contact toaster was provided with an energy gradient in accordance with the invention. The platen was constructed of cast aluminum with a bun heating pathway length of 10.75 inches and a width of 12.5 inches similar to that shown in FIG. 2. Based on the spacing of the heating elements corresponding to elements 40a–d the approximate energy density set forth in Table I was achieved with the indicated heat outputs on one side of platen 14.

TABLE I

| Platen Section Heating Element | Heating Element Output (Watts) | Length of Pathway Heated (Inches) | Approximate Surface Area Heated on One Side (Square Inches) | Approximate Wattage per Square Inch |
|---|---|---|---|---|
| 40a | 725 | 2.5 | 31.25 | 11.6 |
| 40b | 725 | 2.5 | 31.25 | 11.6 |
| 40c | 650 | 2.5 | 31.25 | 10.4 |
| 40d | 650 | 3.25 | 40.625 | 8 |

As illustrated in the foregoing table, the approximate decreasing energy gradient is about 3.6 watts per square inch over the entire length of toasting pathway P1.

While the invention has been described with respect to certain embodiments, it is to be understood that the invention is capable of numerous modifications, changes and rearrangements, and such modifications, changes and rearrangements are intended to be within the scope of the appended claims.

What is claimed is:

1. A device for toasting food products comprising:
   a toasting chamber for toasting food items, the toasting chamber having an inlet for receiving food items and an outlet for discharging the food items after toasting, a platen having a toasting surface defining a toasting pathway along which the food items are toasted, and a conveyor for transporting the food items along the toasting pathway of the toasting surface while in contact with the toasting surface to toast the food items;
   said platen including heating means for heating the toasting surface by application of energy to the platen, said heating means providing an energy gradient that decreases in the direction of transport of the food items along the toasting pathway of at least about 0.25 watts per square inch of platen surface area relative to the entire length of the toasting pathway.

2. The device of claim 1 wherein said heating means comprises at least one electrical resistance heating element configured to provide said decreasing energy gradient.

3. The device of claim 1 wherein said heating means comprises a plurality of heating elements associated with the platen and spaced apart along the toasting pathway to provide said decreasing energy gradient.

4. The device of claim 1 wherein the energy gradient is sufficient to maintain the platen temperature along the toasting pathway within ±30° F. of a platen set point temperature when the device is toasting food products continuously.

5. The device of claim 1 wherein the energy gradient is sufficient to maintain the platen temperature along the toasting pathway within ±10° F. of a platen set point temperature when the device is toasting food products continuously.

6. The device of claim 1 further comprising sensing means for sensing a value related to temperature of the platen during toasting.

7. The device of claim 6 further comprising means for adjusting the temperature of the toasting surface in response to the measurement of the value sensed by said sensing means.

8. The device of claim 6 wherein said sensing means comprises a thermocouple associated with said platen.

9. A device for toasting food products comprising:
   a toasting chamber for toasting food items, the toasting chamber having an inlet for receiving food items and an outlet for discharging the food items after toasting, a platen having a toasting surface defining a toasting pathway along which the food items are toasted, and sensing means for sensing a value related to temperature of the platen during toasting:
   said platen including heating means for heating the toasting surface by application of energy to the platen, said heating means providing an energy gradient that decreases in the direction of transport of the food items along the toasting pathway of at least about 0.25 watts per square inch of platen surface area relative to the entire length of the toasting pathway; and
   said sensing means comprising a plurality of thermocouples associated with said platen and spaced apart along the length of the toasting surface.

10. The device of claim 3 wherein the heating elements are longitudinally spaced apart along the length of the toasting pathway.

11. The device of claim 10 wherein said heating elements are uniformly longitudinally spaced apart.

12. The device of claim 11 wherein the heating elements have different heat outputs to provide the energy gradient.

13. The device of claim 3 further comprising means to independently control the heating elements.

14. The device of claim 1 wherein the heating means comprises a serpentine heating element contained within said platen.

15. A device for toasting food products comprising:
   a toasting chamber for toasting food items, the toasting chamber having an inlet for receiving food items and an outlet for discharging the food items after toasting, a platen having a toasting surface defining a toasting pathway alone which the food items are toasted;
   said platen including heating means for heating the toasting surface by application of energy to the platen, said heating means providing an energy gradient that decreases in the direction of transport of the food items alone the toasting pathway of at least about 0.25 watts per square inch of platen surface area relative to the entire length of the toasting pathway; and
   said platen comprising at least two discrete body sections, arrayed together to define the toasting pathway, each platen body section containing a separate heating element.

16. The device of claim 15 further comprising a control system to independently control said heating elements.

17. A platen for a contact toaster comprising:
   a body having a toasting surface defining a toasting pathway and having a length over which food items can be conveyed for toasting while the food items are in contact with said toasting surface; and
   means for heating the toasting surface to a toasting temperature and for providing an energy gradient that decreases along the toasting pathway.

18. The platen of claim 17 wherein said heating means comprises a plurality of heating elements associated with the platen and spaced apart along the toasting pathway to provide said decreasing energy gradient.

19. The platen of claim 18 wherein the heating elements have different heat outputs to provide said energy gradient.

20. The platen of claim 19 wherein said heating elements are uniformly longitudinally spaced apart along the toasting pathway.

21. A method of toasting food items comprising:
   moving a plurality of food items sequentially along a platen;
   providing a toasting surface on said platen defining a toasting pathway along which pathway the food items become toasted;
   heating the toasting surface sufficiently for toasting;
   transporting the food items along the toasting pathway and in contact with the toasting surface; and
   adjusting the temperature of the platen along the toasting pathway including by supplying heat to the platen in an energy gradient that decreases by at least 0.25 watts per square inch in the direction of transport of the food items along the toasting pathway.

22. The method of claim 21 wherein the temperature of the platen along the toasting pathway is ±30° F. of a platen set point temperature, during continuous toasting of food items.

23. The method of claim 22 wherein the temperature of the platen along the toasting pathway is ±10° F. of the platen set point temperature.

24. A device for toasting food items comprising a toasting chamber, the toasting chamber having:
- a platen comprising two toasting surfaces opposed to each other, each said toasting surface defining a toasting pathway along which the food items are toasted as the food items are in contact with said toasting surface; and
- a pair of conveyors for transporting the food items along the toasting pathways, each said conveyor disposed in spaced relation from one of said toasting surfaces, each said conveyor defining an inlet for receiving the food items and an outlet for discharging the food items after toasting;
- wherein said platen includes at least one heating element for heating the toasting surfaces by application of energy to the platen, said at least one heating element being disposed along the toasting pathways and providing an energy gradient that decreases in the direction of transport of the food items along each said toasting pathway of at least about 0.25 watts per square inch of platen surface area relative to the entire length of the toasting pathway.

25. The device of claim 24 wherein said at least one heating elements are spaced along the toasting pathways to provide said decreasing energy gradient.

26. The device of claim 24 wherein said platen comprises at least two discrete body sections to provide the desired shape and dimensions of said platen, the body sections being arrayed together to define the toasting pathways, each platen body section containing a separate heating element.

27. The device of claim 26 further comprising a control system to independently control said heating elements.

28. The device of claim 24 wherein the energy gradient is sufficient to maintain the platen temperature along each said toasting pathway within ±10° F. of a platen set point temperature when the device is toasting food products continuously.

29. The device of claim 24 wherein the energy gradient is sufficient to maintain the platen temperature along each said toasting pathway within ±30° F. of a platen set point temperature when the device is toasting food products continuously.

30. The device of claim 24 further comprising sensing means for sensing a value related to temperature of the platen during toasting.

31. The device of claim 24 further comprising means for adjusting the temperature of each said toasting surface in response to the measurement of the value sensed by said sensing means.

32. The device of claim 28 wherein said sensing means comprises a thermocouple associated with said platen.

33. The device of claim 29 wherein said sensing means comprises a plurality of thermocouples associated with said platen and spaced apart along the length of each said toasting surface.

* * * * *

UNITED STATES PATENT AND TRADEMARK OFFICE
CERTIFICATE OF CORRECTION

PATENT NO. : 6,177,654 B1
DATED : January 23, 2001
INVENTOR(S) : Glenn Schackmuth It is certified that error appears in the above-identified patent and that said Letters Patent is hereby corrected as shown below:

Column 3,
Line 33, delete "preformed" and insert therefor -- performed --.

Column 5,
Line 2, delete "Output" and insert therefor -- output --.

Column 8, claim 15,
Line 15, delete "alone" and insert therefor -- along --.
Line 20, delete "alone" and insert therefor -- along --.

Signed and Sealed this

Fifth Day of February, 2002

Attest:

Attesting Officer

JAMES E. ROGAN
Director of the United States Patent and Trademark Office